United States Patent
Carlsen (12)

(10) Patent No.: US 6,313,847 B1
(45) Date of Patent: *Nov. 6, 2001

(54) BLENDING GRAPHICS OBJECTS IN A FRAME BUFFER

(75) Inventor: Stephen E. Carlsen, Issaquah, WA (US)

(73) Assignee: Adobe Systems Incorporated, San Jose, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/996,993

(22) Filed: Dec. 22, 1997

(51) Int. Cl.$^7$ .................................................. G06T 11/60
(52) U.S. Cl. ............................................... 345/629
(58) Field of Search ........................... 345/149, 152–155, 345/431, 133, 420, 202, 112–114; 382/237

(56) References Cited

U.S. PATENT DOCUMENTS

| | | | |
|---|---|---|---|
| 4,679,038 | * | 7/1987 | Bantz et al. ...................... 345/113 X |
| 5,243,447 | * | 9/1993 | Bodenkamp et al. ............... 345/133 |
| 5,333,243 | * | 7/1994 | Best et al. .............................. 345/153 |
| 5,394,523 | * | 2/1995 | Harris ................................. 345/431 X |
| 5,502,804 | | 3/1996 | Butterfield . |
| 5,781,184 | * | 7/1998 | Wasserman et al. ................. 345/202 |
| 5,798,762 | * | 8/1998 | Sfarti et al. ........................... 345/420 |
| 5,896,136 | * | 4/1999 | Augustine et al. .................. 345/431 |
| 5,949,409 | * | 9/1999 | Tanaka et al. ..................... 345/431 X |
| 6,049,339 | * | 4/2000 | Gaglione et al. .................... 345/435 |
| 6,069,637 | * | 4/2000 | Gaglione et al. .................... 345/435 |

FOREIGN PATENT DOCUMENTS

| | | |
|---|---|---|
| 0418868 A | 3/1991 | (EP) . |
| 0465250 A | 1/1992 | (EP) . |
| 0741485 A | 11/1996 | (EP) . |
| 0886235 A | 12/1998 | (EP) . |
| 92 06554 A | 4/1992 | (WO) . |

* cited by examiner

Primary Examiner—Matthew Luu
Assistant Examiner—Chante' Harrison
(74) Attorney, Agent, or Firm—Fish & Richardson P.C.

(57) ABSTRACT

Methods and apparatus that blend graphics data. In a printing device, a first object is received and rendered into a frame buffer; a second object including blending instructions is received for blending with the first object; and rendered data associated with the first object is retrieved from the frame buffer and a blend of the two objects is rendered according to a user-selectable blending algorithm. The frame buffer may be a deep frame buffer. The blended data printed may be of a bit depth reduced from that of the frame buffer. The reduced bit depth may be achieved by halftoning the blended data. The blending algorithm may be transparency, shadow, overprinting, darkening, lightening, screen effect or additive effect. The blending instructions may include a blend operator defining a blend algorithm for blending two objects. In another aspect, a printing device includes an interpreter for receiving object data associated with a background and a foreground of an image; a render engine for rendering object data; a frame buffer for storing rendered data; and a blend processor for retrieving rendered data from the frame buffer and for blending it with rendered data from a foreground object prior to printing. The printer may be configured to receive a page description language description of a page to be printed.

24 Claims, 4 Drawing Sheets

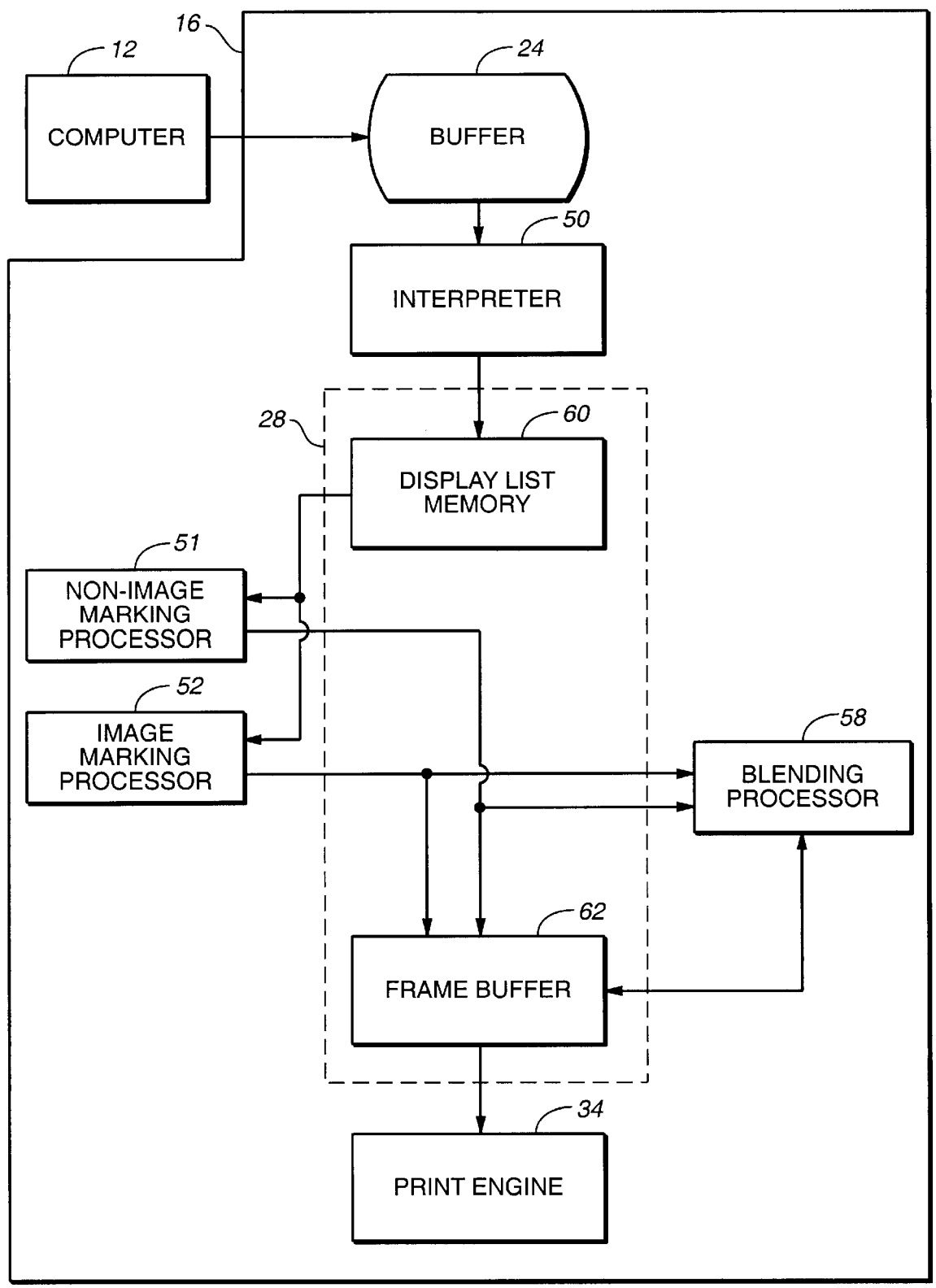
FIG._1

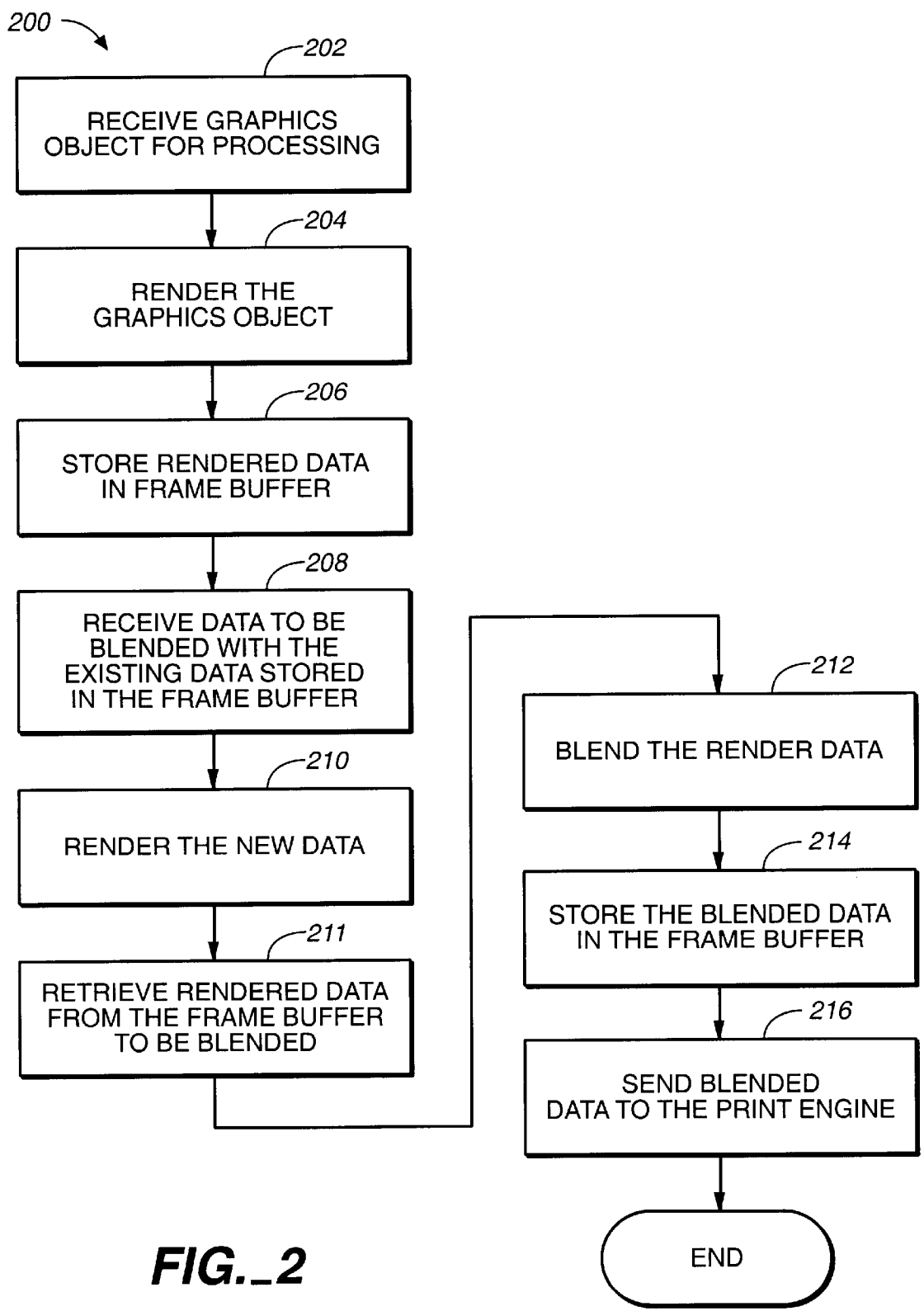
FIG._2

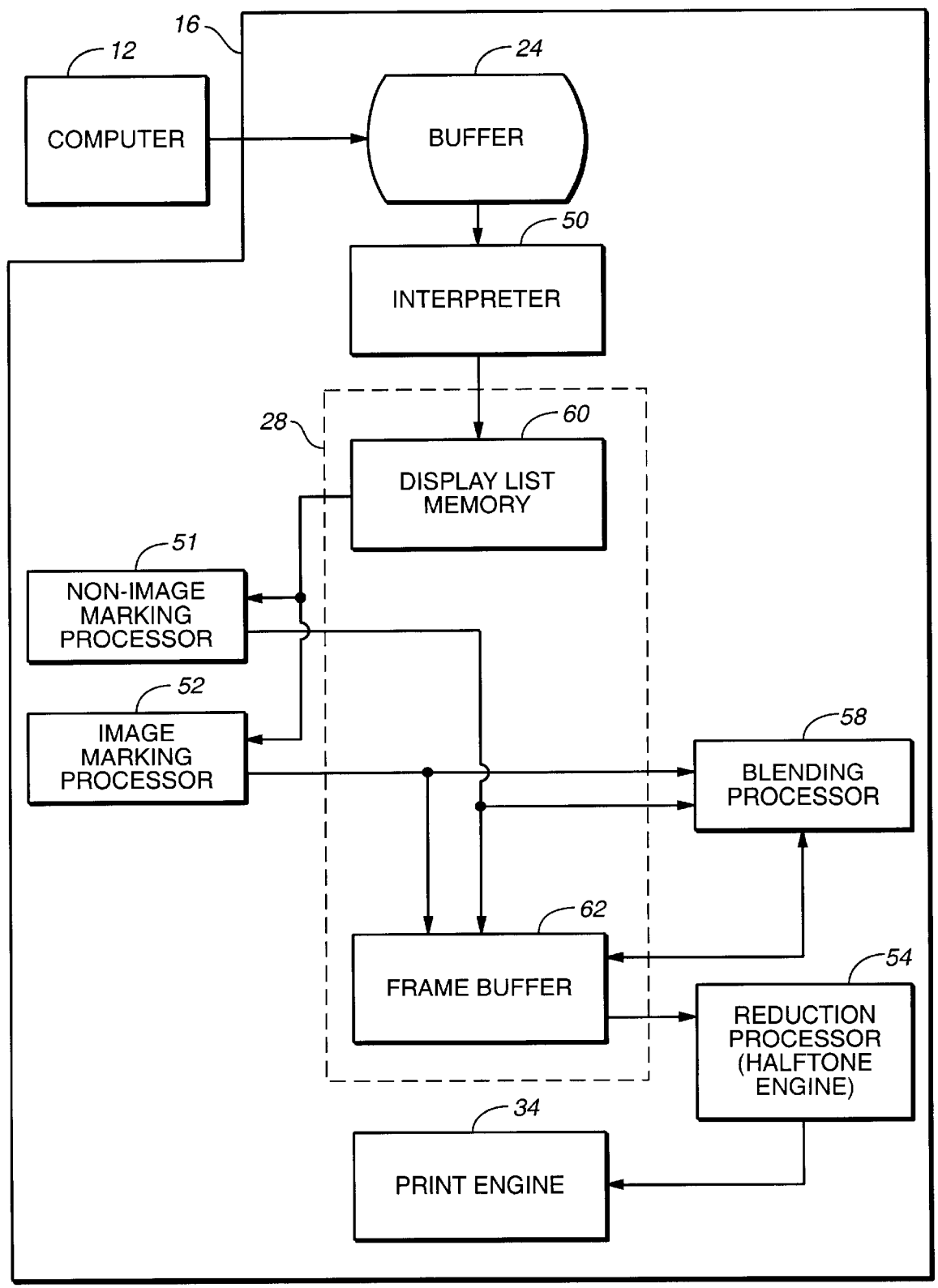
FIG._3

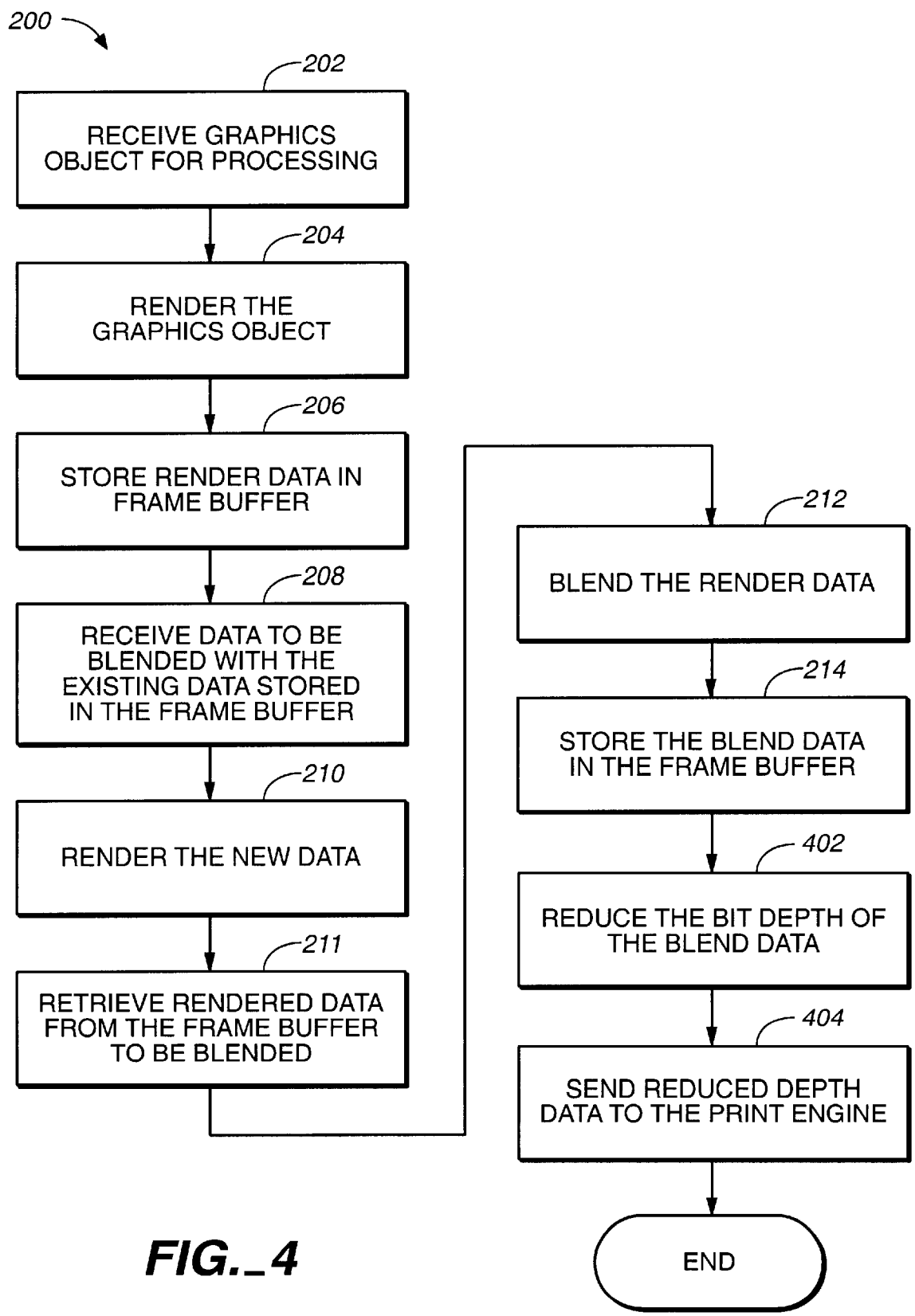
FIG._4

BLENDING GRAPHICS OBJECTS IN A FRAME BUFFER

BACKGROUND OF THE INVENTION

The present invention relates generally to methods and systems for blending computer generated graphics objects and more particularly to methods and apparatus for blending computer generated graphics objects in a frame buffer.

A computer system can output data to a wide variety of output display devices. Output display devices such as laser printers, plotters, image setters and other printing devices produce an image or "visual representation" onto a sheet of paper, a piece of film or the like, while output display devices such as computer monitors develop visual representations on a computer screen.

Many output display devices receive display data in the form of a "pixelmap" and generate visual representations from the display data. A pixel is a fundamental picture element of a visual representation generated by a display device, and a pixelmap is a data structure including information concerning a number of pixels of the representation.

A printing device prints dots on a piece of paper corresponding to the information in a pixelmap. Alternatively, a computer monitor illuminates pixels based upon the information of the pixelmap. A "raster" output device creates a visual representation by displaying the array of pixels arranged in rows and columns from a pixelmap. Most output devices, other than plotters, are raster output devices.

Printing and visual output devices that produce output in response to page description language input are widely used. A page description language is a high level language for describing objects to be displayed by an output device. The PostScript® language developed by Adobe Systems Incorporated of San Jose, Calif., is an example of a page description language. An image to be displayed may be represented and stored in a page description format as a page description language file which includes one or more objects. Generally, a page description language is device independent.

In operation, a conventional printing device configured to process a page description language file interprets the objects within the file and renders the data into a pixelmap to be painted into a frame buffer. Typically, the frame buffer is large enough to store (at least in compressed form) any page that might be printed, and rendered pixelmaps are stored in this buffer. When the entire page has been painted, data stored in the frame buffer may transferred to a print engine or marking engine for printing.

Transparency is a visual blending effect obtained when a background object (image, text, lines or filled regions) is partially obscured by a foreground object that is drawn over the background object. Numerous other blending effects may be used to integrate foreground and background graphics data. Examples of blending effects include a drop shadow effect, a screen effect, darker and lighter effects and overprinting effects.

The manipulation of graphics data at a printer or output display to achieve blending effects typically requires a large amount of memory. Some printing devices include limited memory or shallow frame buffers for performance reasons and thus hereto before were incapable of processing a blending operation at the printer.

SUMMARY

In general, in one aspect, the invention features a method blending graphics data received by a printing device. The method includes rendering a first object received into a frame buffer; receiving a second object including blending instructions for blending the second object and the first object; and retrieving rendered data associated with the first object from the frame buffer and rendering a blend of the first and second object into the frame buffer according to a user-selectable blending algorithm.

Preferred embodiments of the invention include one or more of the following features. The frame buffer is a deep frame buffer. The method includes reducing a bit depth of data stored in the frame buffer and printing reduced bit depth blended data. The reducing step includes halftoning the blended data. The reducing step includes dithering the blended data. The reducing step includes error diffusing the blended data. The blending algorithm is selected from the group of transparency, shadow, overprinting, darkening, lightening, screen effect and additive effect. The blending instructions include a blend operator defining a blend algorithm for blending two objects.

In general, in another aspect, the invention features a method blending graphics data received by a printing device to provide a blending effect for a foreground object with respect to a background object. The method includes receiving a background object; rendering the background object to derive background rendered data; storing the background rendered data in a frame buffer; receiving a foreground object to be blended with the background object; rendering the foreground object to derive foreground rendered data; retrieving the background rendered data from the frame buffer and blending the foreground and background rendered data to generate a blend; and printing the blend.

In general, in another aspect, the invention features a method blending graphics data received by a printing device. The method includes rendering a first object received into a frame buffer; receiving a second object including blending instructions for blending the second object and the first object; retrieving rendered data associated with the first object from the frame buffer; rendering a blend of the rendered data associated with the first object and second object according to a user-selectable blending algorithm to generate blend data; storing blend data in the frame buffer; and reducing the bit depth of the blend data prior to printing.

In general, in another aspect, the invention features apparatus for blending graphics data in a printing device. The apparatus includes an interpreter for receiving object data associated with a background and a foreground of an image to be printed; a render engine for rendering object data; a frame buffer for storing rendered data; and a blend processor for retrieving rendered data stored in the frame buffer and for blending retrieved rendered data associated with a background object with rendered data associated with a foreground object prior to printing.

Preferred embodiments of the invention include one or more of the following features. The render engine generates pixel data from higher level object data, receives object data from the interpreter and paints pixel data representative of the object data into the frame buffer and the blend processor. The interpreter receives a blend operator including blend instructions for blending a received object with an object that has been previously rendered. The apparatus also includes a reduction engine for reducing a bit depth of data stored in the first buffer prior to printing. The reduction engine halftones the data. The reduction engine dithers the data. The reduction engine error diffuses the data.

In general, in another aspect, the invention features a printer configured to receive a page description language description of a page to be printed. The printer includes a frame buffer for storing rendered data; a blending engine for extracting previously rendered data from the frame buffer and blending the previously rendered data with newly received object data; and a print engine for printing blended data resulting in a blending of graphics data according to a user defined blending function.

Preferred embodiments of the invention include one or more of the following features. The newly received object data is rendered prior to blending with the previously rendered data.

Among the advantages of the invention are one or more of the following.

The use of the inventive methods is transparent for non-blended graphics data and thus a performance penalty only occurs when processing blended graphics objects.

A blending process is provided in a printing device to allow for the blending of new data objects with previously rendered data stored in a frame buffer in accordance with user defined blending instructions.

Printing devices having limited memory resources or a print engine configured to support shallow bit depth data may advantageously use the present invention to support blending effects at the printer. Graphics objects may be blended during the rendering process and be subject to a bit depth reduction process prior to their transfer to a print engine in the printing device or in an external device.

Other features and advantages of the invention will become apparent from the following description and from the claims.

BRIEF DESCRIPTION OF THE DRAWINGS

FIG. 1 is a block diagram of a printer according to the invention.

FIG. 2 is a flow chart of a process for implementing blending in a printer.

FIG. 3 is a block diagram of a printer including a reduction processor for producing reduced bit depth output data.

FIG. 4 is a flow chart implementing blending in a printer having reduced bit depth output capability.

DETAILED DESCRIPTION

The following contemporaneously filed and commonly owned patent applications are incorporated by reference: "Dehalftoning of Digital Images" by Stephen Carlsen et al., Ser. No. 08/995,437 "Blending Image Data Using Layers" by Stephen Carlsen et al., Ser. No. 08/995,592; "Transparency Processing in a Page Description Language" by Lars Borg et al., Ser. No. 08/995,611; "Blending with Planar Maps" by Stephen Schiller, et al., Ser. No. 08/999,381 and "Conversion of Alpha-Multiplied Color Data" by Lars Borg et al. Ser. No. 08/996,126.

The present invention may be embodied in any output display device that receives page description data and produces from the data an output image. The invention has particular applicability to printing devices and will be described in terms of an embodiment in such a device, which will be referred to simply as a printer. Printers include plotters, image setters, digital presses, laser printers, dot matrix printers, ink jet printers and the like.

Referring to FIG. 1, a printer 16 receives input data, from a computer 12, for example, and turns the input data into marks on a piece of paper by sending signals to a print engine 34. The printer 16 is configured to receive page description language input data and process it as will be described below. One suitable page description language is the PostScript language. The PostScript language is described in Adobe Systems Incorporated, Adobe PostScript® Language Reference Manual, Addison-Wesley (2d ed., ©1990). Another suitable page description language is the PCL language available from the Hewlett-Packard Company of Palo Alto, Calif. A page description language file sent to a printer specifies objects to be displayed and related information. A PostScript object can, for example, include a bitmap defining a pattern of pixels to be displayed, or the object may reference an outline curve defining a shape to be marked. The object may also include other information such as font and size for character objects and blend information as will be described in greater detail below.

Printer 16 includes a buffer 24, a digital data processor, random access memory 28 and print engine 34. The digital data processor also typically includes read-only memory, I/O interfaces, and data transfer paths and busses, none of which are shown.

The digital data processor may be a general or special purpose microprocessor operating under control of computer program instructions executed from a memory. The processor may include a number of special purpose sub-processors, each sub-processor for executing particular portions of the computer program instructions. In the embodiment illustrated in FIG. 1, the processor includes an interpreter 50, a non-image data marking processor 51, an image marking processor 52 and blending processor 58.

Each sub-processor may be a separate circuit able to operate substantially in parallel with the other sub-processors. Some or all of the sub-processors may be implemented as computer program processes (software) tangibly stored in a memory that perform their respective functions when executed. These may share an instruction processor, such as a general purpose integrated circuit microprocessor, or each sub-processor may have its own processor for executing instructions. Alternatively, some or all of the sub-processors may be implemented in an ASIC (application specific integrated circuit).

Interpreter 50 receives objects from computer 12 and pre-processes objects and operators associated therewith prior to rendering by the non-image data and image marking processors 51 and 52, respectively, as will be described in greater detail below.

Image marking processor 52 renders objects or intermediate representations of objects stored in display lists providing deep pixel values directly to RAM 28.

Non-image data marking processor 51 may be invoked to render fills, strokes, and the like, and may request a gray or color tile from a tile rendering process (not shown). If the requested tile is not available in memory, image marking processor 52 may build the tile from a threshold array (not shown). When it has received the requested tile, marking processor 51 copies selected pixels from the tile into RAM 28.

Blending processor 58 combines previously rendered data with newly received objects, rendering them according to an appropriate blending formula into RAM 28.

RAM 28 is a random access memory used by the processor (sub-processors 50–58). RAM 28 may include display list memory 60 and a frame buffer 62. RAM 28 may be partitioned into one or more regions or embodied in one or more separate memory devices.

Objects received by interpreter 50 may be interpreted into display list data for storage in display list memory 60.

Alternatively, graphics data objects may be immediately painted by image marking routine 52 or non-image data marking routine as pixelmaps into frame buffer 62 or into blending processor 58.

Printer 16 may be a color printer and may include a plurality of frame buffers 62, one for each color component. For the purposes of these discussions, a single frame buffer example will be described. The teachings of the present invention are equally well suited to printing devices configured to process objects in multiple colors or color spaces.

Frame buffer 62 may be a deep or intermediate frame buffer. Depth refers to the number of bits per pixel for each color component of an image to be printed. An example of a deep frame buffer may be an 8-bit deep frame buffer having eight (8) bits of data able to represent up to 256 shades of color in a single color component. A shallow frame buffer typically includes a 1-bit deep frame buffer representing just two shades of color (e.g., black or white) per color component. An intermediate frame buffer may be defined as a frame buffer having a depth somewhere between a shallow and what is conventionally regarded as a deep frame buffer. An example of an intermediate depth frame buffer may be a 4-bit deep frame buffer able to represent up to 16 shades of color in a single color component.

Frame buffer 62 may be used to store all the pixel data for an image, a portion of which may be derived by blending received objects or groups of objects. A method of blending groups of objects into layers is described in "Blending Image Data Using Layers" by Lars Borg, Stephen Schiller and Stephen Carlsen cited above. In addition, the frame buffer may be used to store the resultant data derived from a blend of multiple objects.

RAM 28 may be embodied in one or more memory chips. If display list memory 60 and the frame buffer 62 are consolidated into a single memory (a consolidated memory), then the memory may be partitioned or otherwise mapped to reflect the boundaries of the various memory sub-components.

Data flow, rather than physical interconnection, is illustrated between elements of printer 16. Processor and memory components are physically interconnected using a conventional bus architecture.

The printer components that have been described can be packaged in a single product; alternatively, some can be included in computer 12 or otherwise housed separately.

For concreteness, the present invention will be described in terms of blending two graphics objects in a single color space. Application of the invention to other color space representations of an graphics object as well as applications for blending more than two objects are similar.

Referring now to FIGS. 1 and 2, a conventional rendering and marking process for a raster output device is enhanced by the addition of a method for implementing blending (200). Printer 16 receives from computer 12 one or more graphics objects (e.g., associated with a background image, text, line, or filled region) to be rendered (202).

Image marking processor 52 renders the graphics objects (204) generating rendered data for storage in frame buffer 62 (206). Alternatively, if a graphics object does not describe image data, non-image data marking processor 51 may be invoked to render fills, strokes, and the like.

Upon receipt of a graphics object (e.g., image data) which is to be combined in a blending effect with previously rendered graphics objects (208), one of image marking processor 52 and non-image data marking processor 52 processes the "new" image data providing rendered data to the blending processor (210). Blending instructions for designating graphics objects to be blended as well as the blending methodology to implement may be provided as part of a high level operator received from computer 12. The blending instructions may take the form of a blend operator in a PostScript or Portable Document Format (PDF) format as is described in greater detail in "Transparency Processing in a Page Description Language" by Lars Borg, Stephen Carlsen and Stephen Schiller cited above. The graphics object to be blended may be a singular object (e.g., sampled image) or may itself be a blend of graphics data as the result of drawing graphics objects into a layer or off screen bitmap. The use of layers to blend graphics objects is described in greater detail in "Blending Image data using Layers" by Lars Borg, Stephen Schiller and Stephen Carlsen cited above.

Blending processor 58 retrieves rendered data from frame buffer 62 which is to be blended (211). Blending processor 58 blends the rendered data retrieved and the new rendered data (212) and returns a result (blended data) to frame buffer 62 (214). The retrieval and writing process into the frame buffer by the blend processor may be performed a pixel at a time so as to minimize storage requirements in the blending processor. Alternatively, the previously rendered data may be retrieved in whole or part and operated on in parallel by blending processor 58. Blending processor 58 combines the rendered data according to an appropriate blending formula. Examples of blending formulas include:

| Blending Mode | Formula |
| --- | --- |
| Transparency (alpha blend) | N= F * opacity + B * (1−opacity) |
| Shadow | Sh= Normal * B |
| Screen | Scr= N + B − (N * B) |
| Darker | Drk= Min (N, B) |
| Lighter | Ltr= Max (N, B) |
| Add | Add= N + B |
| Overprint | Ovr= N + B −1 | where N is Normal (transparency), F is foreground image data, B is background image data, and opacity is between 0 and 1 (212).

The resultant blended data may be stored in frame buffer 62 and may ultimately be provided directly to print engine 34 for printing an output image including the user-selected blending effect produced by blending processor (216).

Referring now to FIGS. 3 and 4, printer 16 may include a reduction processor for reducing the bit depth of data stored in frame buffer 62 prior to output to the print engine or another output device. The reduction processor may include a halftone engine 54 for halftoning frame buffer data. The process for halftoning images is known in the art. An example of a method for halftoning image data is described in greater detail in co-owned U.S. Pat. No. 5,235,435, entitled "Method of Producing Halftone Images" to Stephen Schiller, issued Aug. 10, 1993, the contents of which are expressly incorporated herein by reference.

The blending process of FIG. 2 may be expanded to add a reduction step (402). More specifically, printer 16 may reduce the bit depth of data stored in the frame buffer prior to transferring data from frame buffer 62 to print engine 34 (404).

Reduction processor 54 may achieve the bit depth reduction of the data in frame buffer 62 by means other than halftoning. For example, dithering or error diffusion operations may be performed to produce the reduced bit depth data.

In this specification, the term "dithering" is used to encompass any process that creates the illusion of continuous tone imagery using a smaller number of colors than are used in an original image. The term "halftoning" is used to refer to the familiar digital process that is based on an explicit or implicit application of a threshold array. The term "error diffusion" is used to refer to a technique that, in effect, maps a pixel value to one of a smaller color set (e.g., to black or white for one-bit error diffusion). and propagates an error term—the difference between the original and the mapped color—to one or more adjacent pixels. Error diffusion does not use a threshold array. Halftoning and error diffusion are both examples of, but do not exhaust the scope of, the concept of dithering.

The present invention has been described in terms of specific embodiments, which are illustrative of the invention and not to be construed as limiting. The invention may be implemented in hardware, firmware or software, or in a combination of them. Other embodiments are within the scope of the following claims.

What is claimed is:

1. A method for blending received graphics data in a printing device, the method comprising:
   receiving a first object in the printing device;
   rendering the first object to generate first rendered data and storing the first rendered data in a frame buffer of the printing device;
   receiving, in the printing device, a second object to be blended with the first object;
   recognizing that the second object is to be blended with the first object;
   rendering the second object to generate second rendered data; and
   retrieving the first rendered data from the frame buffer and blending the second and the first rendered data to generate blended data.

2. The method of claim 1 further comprising printing the blended data.

3. The method of claim 1 wherein the frame buffer is a deep frame buffer.

4. The method of claim 1 wherein the blending is done using a blending algorithm selected from the group of transparency, shadow, overprinting, darkening, lightening, screen effect and additive effect.

5. The method of claim 1 wherein the second object is received with blending instructions including a blend operator identifying a blend algorithm for blending two objects.

6. The method of claim 5 wherein the blended data is stored in the frame buffer.

7. The method of claim 6 further comprising reducing a bit depth of the blended data stored in the frame buffer and printing the reduced-bit-depth blended data.

8. The method of claim 7 wherein the reducing step includes halftoning the blended data.

9. The method of claim 7 wherein the reducing step includes dithering the blended data.

10. The method of claim 7 wherein the reducing step includes error diffusing the blended data.

11. The method of claim 1 wherein the first object is a background object and the second object is a foreground object.

12. The method of claim 1 wherein the first object, the second object, and blending instructions for blending the second object with the first object are received as part of a page description language file received by the printing device, the method further comprising:
   processing the page description language file to interpret objects within the file and render the resulting data into a pixelmap to be painted into the frame buffer.

13. The method of claim 1 wherein the second object is received with blending instructions including a blend operator identifying a blend algorithm for blending two objects, the method further comprising:
   storing the blended data in the frame buffer at a bit depth;
   reducing the bit depth of the blend data prior to printing; and
   printing the reduced-bit-depth blended data.

14. The method of claim 13 wherein the reducing step includes dithering the blended data.

15. The method of claim 13 wherein the blending is done using a blending algorithm selected from the group of transparency, shadow, overprinting, darkening, lightening, screen effect and additive effect.

16. An apparatus for blending graphics data in a printing device comprising:
   an interpreter for receiving object data associated with a background and a foreground portion of an image to be printed;
   a render engine for rendering object data;
   a frame buffer for storing rendered data; and
   a blend processor including means for recognizing when previously rendered data associated with a background object is to be blended with data associated with a foreground object, the blend processor operable to retrieve rendered data stored in the frame buffer and blend retrieved rendered data associated with the background object with rendered data associated with the foreground object prior to printing.

17. The apparatus of claim 16 wherein the render engine generates pixel data from higher level object data, receives object data from the interpreter and paints pixel data representative of the object data into the frame buffer and the blend processor.

18. The apparatus of claim 17 wherein the interpreter receives a blend operator including blend instructions for blending a received object with an object that has been previously rendered.

19. The apparatus of claim 16 further comprising a reduction engine for reducing a bit depth of data stored in the first buffer prior to printing.

20. The apparatus of claim 16 wherein the reduction engine halftones the data.

21. The apparatus of claim 16 wherein the reduction engine dithers the data.

22. The apparatus of claim 16 wherein the reduction engine error diffuses the data.

23. A printer configured to receive a page description language description of a page to be printed, comprising:
   a frame buffer for storing rendered data;
   a blending engine including means for recognizing when previously rendered data associated is to be blended with newly received data, the blend processor operable to extracted the previously rendered data from the frame buffer and blend the previously rendered data with newly received object data in accordance with a user defined blending function; and
   a print engine for printing blended data.

24. The printer of claim 23 wherein the newly received object data is rendered prior to blending with the previously rendered data.

* * * * *

UNITED STATES PATENT AND TRADEMARK OFFICE
CERTIFICATE OF CORRECTION

PATENT NO. : 6,313,847 B1
DATED : November 6, 2001
INVENTOR(S) : Stephen E. Carlsen It is certified that error appears in the above-identified patent and that said Letters Patent is hereby corrected as shown below:

<u>Column 8,</u>
Line 58, please delete "extracted" and insert -- extract -- therefor.

Signed and Sealed this

Fourth Day of June, 2002

Attest:

Attesting Officer

JAMES E. ROGAN
*Director of the United States Patent and Trademark Office*